(12) United States Patent
Catarius et al.

(10) Patent No.: US 10,670,745 B1
(45) Date of Patent: Jun. 2, 2020

(54) STATISTICAL PHOTO-CALIBRATION OF PHOTO-DETECTORS FOR RADIOMETRY WITHOUT CALIBRATED LIGHT SOURCES COMPRISING AN ARITHMETIC UNIT TO DETERMINE A GAIN AND A BIAS FROM MEAN VALUES AND VARIANCE VALUES

(71) Applicant: Government of the United States, as represented by the Secretary of the Air Force, Wright-Patterson AFB, OH (US)

(72) Inventors: Adrian M. Catarius, Alamogordo, NM (US); Nicholas Yielding, Rio Rancho, NM (US); Stephen C. Cain, Dayton, OH (US); Michael Dan Seal, Beavercreek, OH (US)

(73) Assignee: The Government of the United States as Represented by the Secretary of the United States, Wright-Patterson AFB, OH (US)

( * ) Notice: Subject to any disclaimer, the term of this patent is extended or adjusted under 35 U.S.C. 154(b) by 84 days.

(21) Appl. No.: 16/134,299

(22) Filed: Sep. 18, 2018

Related U.S. Application Data

(60) Provisional application No. 62/560,249, filed on Sep. 19, 2017.

(51) Int. Cl.
*G02B 21/36* (2006.01)
*G01T 7/00* (2006.01)
(Continued)

(52) U.S. Cl.
CPC ........... *G01T 7/005* (2013.01); *H04N 5/3651* (2013.01); *H04N 5/3675* (2013.01); *H04N 5/372* (2013.01); *H04N 5/378* (2013.01)

(58) Field of Classification Search
CPC .... G01C 25/005; G02B 21/008; G02B 21/26; G02B 21/36; G02B 21/361; G01T 1/2018;
(Continued)

(56) References Cited

U.S. PATENT DOCUMENTS 4,328,552 A 5/1982 Stovall
5,629,872 A 5/1997 Gross
(Continued)

OTHER PUBLICATIONS

S. J. O'Toole, T. R. Bedding, H. Kjeldsen, T. C. Teixeira, G. Roberts, F. van Wyk4, D. Kilkenny, N. D'Cruz, and I. K. Baldry, "Time Series Spectroscopy of Pulsating Subdwarf B Stars: PG 1605+072," The Astrophysical Journal Letters, vol. 537, No. 1, Jun. 20, 2000.

(Continued)

*Primary Examiner* — Que Tan Le
(74) *Attorney, Agent, or Firm* — AFMCLO/JAZ

(57) ABSTRACT

Calibration of a radiometry system uses a readout circuit of a photo-detector to provide first and second measurements collected over first and second integration times, respectively, where the first and second measurements are related to a photonic input to the photo-detector by a gain and a bias. First mean and variance values are computed for a plurality of first measurements. Second mean and variance values are computed for a plurality of second measurements. The gain and bias are determined from the first and second mean values and the first and second variance values without the use of a calibrated source. The rate of photonic input to the photo-detector and the variance of noise added in the readout circuit may also be determined.

23 Claims, 4 Drawing Sheets

(51) Int. Cl.
*H04N 5/365* (2011.01)
*H04N 5/378* (2011.01)
*H04N 5/372* (2011.01)
*H04N 5/367* (2011.01)

(58) Field of Classification Search
CPC ........ G01T 7/005; H04N 9/045; H04N 5/217; G06T 7/20; G01S 2013/466; G01S 5/14
USPC .............................. 250/214 R, 208.1, 559.1
See application file for complete search history.

(56) References Cited

U.S. PATENT DOCUMENTS

| | | |
|---|---|---|
| 6,529,622 B1 | 3/2003 | Pourjavid |
| 6,629,041 B1 | 9/2003 | Marbach |
| 7,233,688 B2 | 6/2007 | Ritt |
| 7,405,412 B2 | 7/2008 | Lewis |
| 7,424,170 B2 | 9/2008 | Steinberg |
| 7,483,803 B2 | 1/2009 | Dorsey |
| 7,872,678 B2 | 1/2011 | Fuchs |
| 7,961,134 B2 * | 6/2011 | Ranney ............... G06K 9/00711 342/174 |
| 8,009,209 B2 | 8/2011 | Chapman |
| 8,145,444 B1 | 3/2012 | Bickford |
| 8,178,839 B2 | 5/2012 | Nakamura |
| 8,335,670 B2 | 12/2012 | Bronson |
| 8,428,909 B2 | 4/2013 | Collins |
| 8,491,190 B2 | 7/2013 | Glasser |
| 8,664,616 B2 | 3/2014 | Rundle |
| 8,675,101 B1 | 3/2014 | Linzer |
| 8,706,437 B2 | 4/2014 | Walmsley |
| 9,195,899 B2 | 11/2015 | Topfer |
| 9,360,568 B2 | 6/2016 | Montemont |
| 9,364,192 B2 | 6/2016 | Vija |
| 9,445,021 B1 | 9/2016 | Linzer |
| 9,595,934 B2 | 3/2017 | Wolfe |
| 9,826,182 B2 | 11/2017 | Glasser |
| 9,832,402 B2 | 11/2017 | Elikhis |
| 9,927,539 B2 | 3/2018 | Shahar |
| 10,025,891 B1 | 7/2018 | Zaki |
| 2005/0151965 A1 | 7/2005 | Bissett |
| 2008/0049231 A1 | 2/2008 | Bachalo |
| 2008/0170228 A1 | 7/2008 | Jiang |
| 2008/0201103 A1 | 8/2008 | Yang |
| 2010/0049462 A1 | 2/2010 | Krafthefer |
| 2010/0232725 A1 | 9/2010 | Luijendijk |
| 2011/0066385 A1 | 3/2011 | Rajwa |
| 2013/0083324 A1 | 4/2013 | Wilhelm |
| 2013/0306851 A1 | 11/2013 | Le Noc |
| 2014/0107975 A1 | 4/2014 | Manton |
| 2015/0085979 A1 | 3/2015 | Zheng |
| 2016/0103063 A1 | 4/2016 | Kurasawa |
| 2016/0299004 A1 | 10/2016 | Thamm |
| 2017/0115409 A1 | 4/2017 | Laurence |
| 2017/0269240 A1 | 9/2017 | Shahar |
| 2018/0038970 A1 | 2/2018 | Li |
| 2018/0073980 A1 | 3/2018 | Caine |
| 2018/0074215 A1 | 3/2018 | Marsden |

OTHER PUBLICATIONS

J. G. Harris and Yu-Ming Chiang, "Nonuniformity correction of infrared image sequences using the constant-statistics constraint," in IEEE Transactions on Image Processing, vol. 8, No. 8, pp. 1148-1151, Aug. 1999.

M. Hayat, S. Torres, E. Armstrong, S. Cain, and B. Yasuda, "Statistical algorithm for nonuniformity correction in focal-plane arrays," Appl. Opt. 38, 772-780 (1999).

R. Hardie, M. Hayat, E. Armstrong, and B. Yasuda, "Scene-based nonuniformity correction with video sequences and registration," Appl. Opt. 39, 1241-1250 (2000).

Adrian M. Catarius, Adrian M. Catarius, Michael D. Seal, Michael D. Seal, "Static scene statistical algorithm for nonuniformity correction in focal-plane arrays," Optical Engineering 54(10), 104111 (Oct. 20, 2015).

Thorlabs, Product sheet, LED with Ball Lens, QTN015163-S01, Rev A, Mar. 23, 2016.

Allied Vision Technologies, Product sheet, AVT Stingray F-504B / F-504C, AVT Stingray F-504B / F-504C fiber, Oct. 2008.

Catarius, Adraian M., "Static Scene Statistical Non-Uniformity Correction" (2015).Theses and Dissertations. 24. http://scholar.afit.edu/etd/24.

Nicholas J. Yielding, Stephen S. Cain, "Statistically Applied Non-Uniformity Correction (SANUC)," Proc. SPIE 9982, Unconventional Imaging and Wavefront Sensing XII, 99820Y (Sep. 20, 2016).

* cited by examiner

STATISTICAL PHOTO-CALIBRATION OF PHOTO-DETECTORS FOR RADIOMETRY WITHOUT CALIBRATED LIGHT SOURCES COMPRISING AN ARITHMETIC UNIT TO DETERMINE A GAIN AND A BIAS FROM MEAN VALUES AND VARIANCE VALUES

PRIORITY CLAIM

This application claims the benefit of provisional patent application, Ser. No. 62/560,249, filed 19 Sep. 2017, and titled "Statistically Applied Non-Uniformity Correction Method", which is hereby incorporated by reference herein in its entirety.

STATEMENT OF GOVERNMENT INTEREST

The invention described herein may be manufactured, used, and licensed by or for the Government of the United States for all governmental purposes without the payment of any royalty.

BACKGROUND

Calibration of photo-detectors is required in many supplications. There are two types of calibration for photo-detectors. The first type is a relative calibration for elements of a photo-detector array that reduces non-uniformity across the elements of the array. The second type, which is the subject of the present disclosure, is an absolute calibration that allows photo-detector to provide an absolute measurement of intensity or radiance. The absolute calibration is also referred to as a radiometric calibration. In particular, the number of photons striking the detector in a given time interval (the integration time) can be determined from the electrical output of the detector using the results of the calibration. Radiometry is a set of techniques for measuring electromagnetic radiation.

Photo-detector arrays, such as charge-couple device (CCD) arrays for example, need to be calibrated to identify bad pixels and achieving non-uniformity correction. This is commonly accomplished using dark frames and compensates for relative differences in the sensors of an array However, since only the relative responses of the detectors in the array are computed, this kind of calibration technique does not achieve absolute or radiometric calibration of the array.

Common procedures for radiometric calibration utilize a calibration source, that is a source with a known radiance. This process can be used to calibrate photo-detectors as long as a calibration source is available and is well characterized.

A previous attempt at creating a procedure for calibrating a photo-detector using the underlying Poisson nature of the photo-detection required calculations of the skewness of the photo-detector measurements. However, the approach relies on estimating the third central moment of measurement. This estimation may require thousands of measurements. This is a lengthy procedure, especially when all elements of an array are to be calibrated.

Accordingly, there exists a need to provide a radiometric calibration procedure that can determine calibration parameters from a reduced number of measurements without the use of a calibrated source of known radiance.

SUMMARY OF INVENTION

The present invention overcomes the foregoing problems and other shortcomings, drawbacks, and challenges of the prior art. While the invention will be described in connection with certain embodiments, it will be understood that the invention is not limited to these embodiments. To the contrary, this invention includes all alternatives, modifications, and equivalents as may be included within the spirit and scope of the present invention.

The present invention may include an apparatus that determines radiometric calibration values for a radiometry system that may include comprising a readout circuit configured to retrieve a first input from a photo-detector collected over a first integration time to provide a first measurement, and to retrieve a second input from the photo-detector collected over a second integration time to provide a second measurement, where the first and second measurements are related to a photonic input to the photo-detector by a gain and a bias; an averaging unit configured to determine a first mean value of a plurality of first measurements and a second mean value of a plurality of second measurements; a variance unit configured to determine a first variance value of the plurality of first measurements and a second variance value of the plurality of second measurements, when the first variance value is dependent upon the first mean value and the second variance value is dependent upon the second mean value; and an arithmetic unit configured to determine the gain and bias from the first and second mean values and the first and second variance values.

In one embodiment the apparatus may further include where the readout circuit is subject to additive noise and where the arithmetic unit is further configured to determine a variance of the additive noise.

In one embodiment the apparatus may further include where the gain and bias determined by the arithmetic unit are further dependent upon one or more third mean values and one or more third variances, computed from measurements collected over one or more third integration times.

In one embodiment the apparatus may further include where the second integration time is approximately twice the first integration time. In one embodiment the apparatus may further include where the second integration time is at least twice the first integration time. In one embodiment the apparatus may further include where the arithmetic unit is configured to determine the gain and bias from the first and second mean values and the first and second variance values dependent upon the first and second integration times or a ratio between the first and second integration times.

In one embodiment the apparatus may further include a calibrator configured to receive a measurement from a photo-detector; and determine a photonic input to the photo-detector, from the received measurement, dependent upon the determined gain and the determined bias. In one embodiment the apparatus may further include being configured to determine a number of photons received by the photo-detector during an integration time.

In one embodiment the apparatus may further include the photo-detector. In one embodiment the apparatus may further include the photo-detector comprising a charge-coupled-device (CCD) array.

In one embodiment the present invention may include a method of radiometric calibration for determining gain and bias values of a radiometry system. The method in one embodiment may comprise collecting a plurality of first measurements from a photo-detector, each integrated over a first integration time; determining a first mean and a first variance of the first measurements; collecting a plurality of second measurements from a photo-detector, each integrated over a second integration time; determining a second mean and a second variance of the second measurements; determining the gain and bias values of the photo-detector from the first and second means and the first and second variance; and storing the determined gain and bias values for use in determining a photonic input to the photo-detector from a measurement.

In one embodiment the apparatus may further include the method where the bias B is determined as $$B = \frac{T_2 \overline{D}_1 - T_1 \overline{D}_2}{T_2 - T_1},$$

where $T_1$ is the first integration time, $T_2$ is the second integration time, $\overline{D}_1$ is the first mean and $\overline{D}_2$ is the second mean, and where the gain is determined as:

$$G = \frac{\sigma_{D_2}^2 - \sigma_{D_1}^2}{\overline{D}_2 - \overline{D}_1},$$

where $\sigma_{D_1}^2$ is the first variance and $\sigma_{D_2}^2$ is the second variance.

In one embodiment the method may further include the method where collecting the plurality of first and second measurements from the photo-detector subject to readout noise, and the method further comprising: determining a variance of the readout noise from the first and second variances.

In one embodiment the method may further include the method where the variance of the readout noise is determined as $$\sigma_n^2 = \frac{T_2 \sigma_{D_1}^2 - T_1 \sigma_{D_2}^2}{T_2 - T_1},$$

where $T_1$ is the first integration time, $T_2$ is the second integration time, $\sigma_{D_1}^2$ is the first variance, and $\sigma_{D_2}^2$ is the second variance.

In one embodiment the method may further include the method further comprising determining a rate of photonic input to the photo-detector as $$r = \frac{(\overline{D}_2 - \overline{D}_1)^2}{(T_2 - T_1)(\sigma_{D_2}^2 - \sigma_{D_1}^2)},$$

where $T_1$ is the first integration time, $T_2$ is the second integration time, $\overline{D}_1$ is the first mean, $\overline{D}_2$ is the second mean, $\sigma_{D_1}^2$ is the first variance, and $\sigma_{D_2}^2$ is the second variance.

In one embodiment the method may further include the method further comprising: collecting a third measurement D from the photo-detector, the measurement integrated over a third integration time; retrieving the stored gain value G and a stored bias value B; and determining a photonic input K to the photo-detector according to:

$$K=(D-B)/G$$

In one embodiment the method may further include the method further comprising: setting the first integration time; and setting the second integration time.

In one embodiment the present invention may include a non-transitory computer readable medium storing a program of instructions that, when executed on a processor, performs the method of radiometric calibration for determining gain and bias values of a radiometry system, the method comprising: collecting a plurality of first measurements from a photo-detector, each integrated over a first integration time; determining a first mean and a first variance of the first measurements; collecting a plurality of second measurements from a photo-detector, each integrated over a second integration time; determining a second mean and a second variance of the second measurements; determining the gain and bias values of the photo-detector from the first and second means and the first and second variance; and storing the determined gain and bias values for use in determining a photonic input to the photo-detector from a measurement.

In one embodiment the above method may further include an apparatus that determines radiometric calibration values for a radiometry system in one embodiment comprising: a readout circuit configured to retrieve a first input from a photo-detector collected over a first integration time to provide a first measurement, and to retrieve a second input from the photo-detector collected over a second integration time to provide a second measurement, where the first and second measurements are related to a photonic input to the photo-detector by a gain and a bias; a timer, coupled to the readout circuit, and configured to set the first and second integration times and a hardware processor. The hardware processor configured to compute a first mean value of a plurality of first measurements and a second mean value of a plurality of second measurements; compute a first variance value of the plurality of first measurements and a second variance value of the plurality of second measurements, when the first variance value is dependent upon the first mean value and the second variance value is dependent upon the second mean value; and determine the gain and bias from the first and second mean values and the first and second variance values, and a memory configured to store the determined gain and bias.

In one embodiment the apparatus may further include a calibrator configured to receive a measurement from a photo-detector; and determine a photonic input to the photo-detector, from the received measurement, dependent upon the determined gain and the determined bias.

In one embodiment the apparatus may further include where the calibrator is further configured to determine a number of photons received by the photo-detector during an integration time. In one embodiment the apparatus may further include the photo-detector. In one embodiment the apparatus may further include the photo-detector comprising a charge-coupled-device (CCD) array.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. The drawings are not necessarily to scale, emphasis instead being placed upon illustrating the principles of the devices, systems.

DETAILED DESCRIPTION

Figure 1:
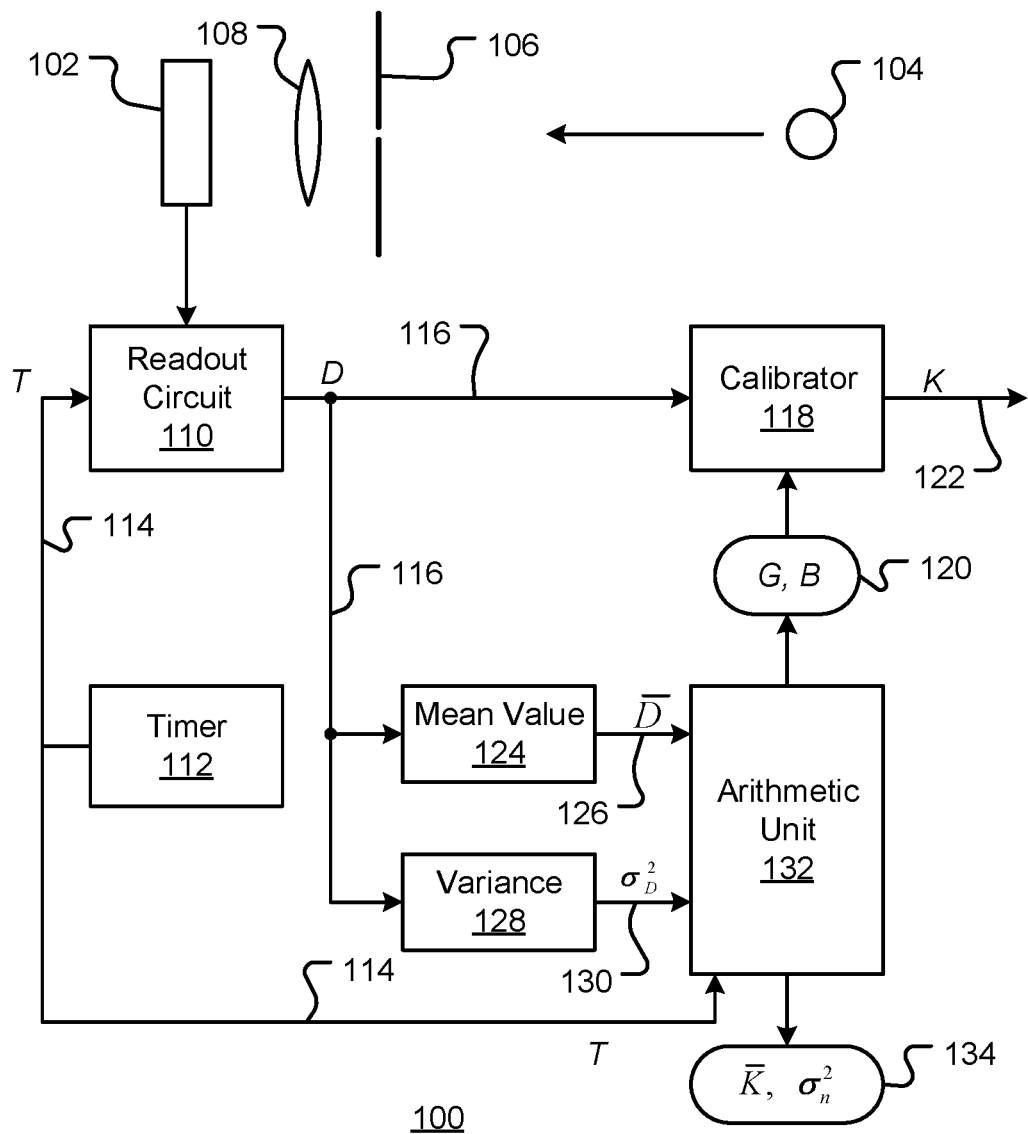
FIG. 1 is a block diagram of radiometry system, in accordance with a representative embodiment.

The various methods, systems, apparatuses, and devices described herein generally provided improved procedures for radiometric (absolute) calibration of photo-detectors without a need for a source with a known radiance.

While this invention is susceptible of being embodied in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals may be used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

All documents mentioned herein are hereby incorporated by reference in their entirety. References to items in the singular should be understood to include items in the plural, and vice versa, unless explicitly stated otherwise or clear from the text.

Recitation of ranges of values herein are not intended to be limiting, referring instead individually to any and all values falling within the range, unless otherwise indicated, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

In the following description, it is understood that terms such as "first," "second," "top," "bottom," "up," "down," "above," "below," and the like, are words of convenience and are not to be construed as limiting terms. Also, the terms apparatus and device may be used interchangeably in this text.

FIG. 1 is a block diagram of radiometry system 100, consistent with various embodiments of the disclosure. System 100 includes a photo-detector 102. Photo-detector 102 may be charge couple device (CCD) array for example, but other detectors may be used. Photons incident on the array are converted into electron charges. The charges are accumulated over an integration time and the CCD is then used to readout the accumulated charge.

In the configuration shown, photo-detector 102 receives light radiated from source 104 via an aperture screen 106 and lens 108.

Readout circuit 110 reads the accumulated charge. The accumulation or integration time T is controlled by timer 112 that provides timing signal 114. Readout circuit 110 provides a measurement signal 116 (D) as output. This may be a digital or analog signal.

In operation, calibrator 118 adjusts the measurement to compensate for the gain (G) and bias (B) of the photo-detector 102 and readout circuit 110, using gain and bias values in memory 120, to provide calibrated output 122 (K) that is an absolute (radiometric) measure of the photonic input to photo-detector 102. The calibrated output is given by $$K=(D-B)/G \qquad (1)$$

Additional calibration values may be used when the response is significantly non-linear. Values of the gain and bias are determined in a calibration procedure. Often, the calibration is made using a radiation source of known radiance. In contrast, the devices, systems, and methods described herein utilize an improved radiometric calibration procedure for photo-detectors that does not require to the use of a calibrated source. The procedure relies only on the first and second statistical moments of measurements. For a given calibration accuracy, the disclosed procedure requires far fewer measurements than prior procedures.

A prior radiometric calibration procedure, referred to as Static Scene Statistical Non-Uniformity Correction (S3NUC) method computes the gain and bias of CCD pixels based on linear gain and bias assumptions. The S3NUC calibration procedure uses higher order statistical moments to negate the requirement for uniform calibrated targets or statistically rich data sets. Instead, it requires two sufficiently static datasets of the same scene at different integration times. However, as originally implemented, the S3NUC algorithm can require thousands of frames to produce sufficiently accurate gain and bias estimates, due explicitly to the need to produce accurate estimates of higher order moments. It is therefore desirable to improve the S3NUC procedure's accuracy and calculation speed while reducing its data requirements. In order to accomplish this, the method disclosed herein avoids the need for higher order statistical moments, which in turn reduces the requirement for large frame counts to achieve satisfactory calibration.

While it is known that photo-detectors do not exhibit an exactly linear response, there are many examples of successfully modeling them as such when input signals are held over a small enough range.

The disclosed method uses two or more different, statistically independent data sets (detector outputs), $D_1$ and $D_2$, encoded by the photo detector. The first set is made over a first integration time while the second set is made over a second integration time that is different to the first integration time. The first photo input at position (i, j) in a two-dimensional array for frame (measurement) k is denoted as $K(i,j,k)$. The corresponding photo input with the second integration time is $\alpha K(i,j,k)$. Assuming the detector response is linear over the first and second integration times, the detector responses for the first and second sets of measurements are $$D_1(i,j,k)=G(i,j)K_1(i,j,k)+B(i,j)+n_1(i,j,k)$$

$$D_2(i,j,k)=G(i,j)K_2(i,j,k)+B(i,j)+n_2(i,j,k) \quad (2)$$

The responses depend upon the gain G, with additive bias, B and readout noises, $n_1$ and $n_2$ on a two-dimensional pixel array index i, j and frame number, k, basis. The goal of the calibration procedure is to find estimates for the gains $G(i,j)$ and biases $B(i, j)$.

The photonic inputs $K_n(i,j,k)$ are assumed to be statistically independent Poisson random variables, while the additive noise terms $n_1$ and $n_2$ are assumed to be statistically independent. Many naturally occurring random processes, such as noise in a readout circuit, can be modeled as zero mean, additive white Gaussian noise (AWGN). For example, a combination of many noise sources tends to have Gaussian (Normal) distribution. These assumptions of the underlying statistical model ensure the statistical independence of the data sets $D_1$ and $D_2$. It is noted that the assumption of AWGN is sufficient but not necessary for the statistical independence of the data sets.

In the sequel, the explicit dependence upon the array coordinates (i, j) is dropped. However, it is to be recognized that the disclosed calibration procedure may be applied to a single array element or to the summed outputs of a number of elements. The calibrated gain and bias include the gain and bias of any electronic circuit used to readout the one or more photo-sensitive elements. The additive noise, which occurs primarily in the readout circuit, is independent of the integration time of the photo-sensitive element.

The mean values of the measurements $\overline{D}_1, \overline{D}_2$, taken over a set of measurements with the same integration time, are given by:

$$\overline{D}_1 = E[[D_1]] = G\overline{K}_1 + B \quad (3)$$

$$\overline{D}_2 = E[D_2] = G\overline{K}_2 + B, \quad (4)$$

where E[.] denotes an expected value. The variances $\sigma_{D_1}^2$, $\sigma_{D_2}^2$ of the measurements are given by:

$$\sigma_{D_1}^2 = E[(D_1 - \overline{D}_1)^2] \quad (5)$$
$$= E[(GK_1 + B + n_1 - G\overline{K}_1 - B)^2]$$
$$= G^2 E[(K_1 - \overline{K}_1)^2] + \sigma_n^2$$

A property of a Poisson distribution is that that mean value and the variance are equal, so that $$E[K_1] = E[(K_1 - \overline{K}_1)^2] = \overline{K}_1. \quad (6)$$

Hence, $$\sigma_{D_1}^2 = G^2 \overline{K}_1 + \sigma_n^2. \quad (7)$$

and $$\sigma_{D_2}^2 = G^2 \overline{K}_2 + \sigma_n^2. \quad (8)$$

If the second set of measurements are made with an integration time that is twice times the integration time used for the first set, then $\overline{K}_2 = 2\overline{K}_1$, since photons are received at the same average rate. Writing $\overline{K} = \overline{K}_1$, the equations become $$\overline{D}_1 = G\overline{K} + B$$

$$\overline{D}_2 = 2G\overline{K} + B$$

$$\sigma_{D_1}^2 = G^2 \overline{K} + \sigma_n^2$$

$$\sigma_{D_2}^2 = 2G^2 \overline{K} + \sigma_n^2. \quad (9)$$

This provides a (non-linear) system of four equations in four unknowns. The equations can be solved using simple algebra to give the calibration parameters $$G = \frac{\sigma_{D_2}^2 - \sigma_{D_1}^2}{\overline{D}_2 - \overline{D}_1}, \quad (10)$$

$$B = 2\overline{D}_1 - \overline{D}_2.$$

These expressions indicate that the calibration parameters may be determined from the mean and variance of measurements made using different integration times. In contrast to prior schemes, there is no requirement to estimate higher order moments such as the skewness, and no requirement for using a calibrated source. The mean photonic input and the variance of the readout noise may also be estimated from the mean and variance of the measurements, and are given by $$\overline{K} = \frac{\overline{D}_2 - \overline{D}_1}{G} = \frac{(\overline{D}_2 - \overline{D}_1)^2}{(\sigma_{D_2}^2 - \sigma_{D_1}^2)} \quad (11)$$

$$\sigma_n^2 = 2\sigma_{D_1}^2 - \sigma_{D_2}^2.$$

The mean values and variance values are estimated from a finite set of measurements (of the order of 100 frames, for example).

Referring again to FIG. 1, measurements D (116) are provided as output from Readout Circuit 110. For each set of measurements with integration time $T_m$, Mean Value unit 124 computes the mean value $\overline{D}_m$ (126) over the set of measurements and Variance Unit 128 computes the variance $\sigma_{D_m}^2$ (130) over the set. The means and variances from two or more measurement sets, together with the integration times for the measurements, are used in arithmetic unit 132 to determine the gain and bias (using equation (10), for example). The determined gain and bias are stored in memory 120 for use by calibrator 118. The arithmetic unit 132 may also provide estimates of the mean photonic input and the readout noise variance (using equation (11) for example). These may be output or stored in memory 134. The readout variance value may be used in a post-processing filter for output 122.

In general, two or more measurements set may be collected with different integration times. For an integration time T, the mean photonic input is $\overline{K}(T)=rT$, where r is the photonic rate. The mean and variance of the measurements can then be written as $$\overline{D}(T) = G\overline{K}(T) + B = TGr + B = [T \ 1]\begin{bmatrix} Gr \\ B \end{bmatrix} \quad (12)$$

$$\sigma_D^2(T) = G^2\overline{K}(T) + \sigma_n^2 = TG^2r + \sigma_n^2 = [T \ 1]\begin{bmatrix} G^2r \\ \sigma_n^2 \end{bmatrix}.$$

The mean and variance may be collected for M(>1) measurement sets with different integration times $T_1, T_2, K, T_M$ to give $$d == T\begin{bmatrix} Gr \\ B \end{bmatrix} \quad (13)$$

$$v = T\begin{bmatrix} G^2r \\ \sigma_n^2 \end{bmatrix},$$

where $$d = \begin{bmatrix} \overline{D}(T_1) \\ \overline{D}(T_2) \\ M \\ \overline{D}(T_M) \end{bmatrix}, T = \begin{bmatrix} T_1 & 1 \\ T_2 & 1 \\ M & M \\ T_M & 1 \end{bmatrix} \text{ and } v = \begin{bmatrix} \sigma_D^2(T_1) \\ \sigma_D^2(T_2) \\ M \\ \sigma_D^2(T_M) \end{bmatrix}. \quad (14)$$

Solving gives $$\begin{bmatrix} Gr \\ B \end{bmatrix} = (T^TT)^{-1}T^Td \quad (15)$$

$$\begin{bmatrix} G^2r \\ \sigma_n^2 \end{bmatrix} = (T^TT)^{-1}T^Tv$$

$$G = \frac{G^2r}{Gr}, r = \frac{(Gr)^2}{G^2r}$$

For two measurement sets, this gives $$Gr = \frac{\overline{D}_2 - \overline{D}_1}{T_2 - T_1}, B = \frac{T_2\overline{D}_1 - T_1\overline{D}_2}{T_2 - T_1}, \quad (16)$$

$$G^2r = \frac{\sigma_{D_2}^2 - \sigma_{D_1}^2}{T_2 - T_1}, \sigma_n^2 = \frac{T_2\sigma_{D_1}^2 - T_1\sigma_{D_2}^2}{T_2 - T_1}, \quad (17)$$

$$G = \frac{G^2r}{Gr} = \frac{\sigma_{D_2}^2 - \sigma_{D_1}^2}{\overline{D}_2 - \overline{D}_1}, \quad (18)$$

$$r = \frac{(Gr)^2}{G^2r} = \frac{(\overline{D}_2 - \overline{D}_1)^2}{(T_2 - T_1)(\sigma_{D_2}^2 - \sigma_{D_1}^2)}, \quad (19)$$

which reduces to the initial expression given above when $T_1=1$ and $T_2=2$.

It will be apparent that the formula may be expressed in a number of mathematically equivalent ways. For example, in terms of a ratio between the integration times:

$$B = \frac{\frac{T_2}{T_1}\overline{D}_1 - \overline{D}_2}{\frac{T_2}{T_1} - 1}, \sigma_n^2 = \frac{\frac{T_2}{T_1}\sigma_{D_1}^2 - \sigma_{D_2}^2}{\frac{T_2}{T_1} - 1}, \quad (20)$$

Figure 5:
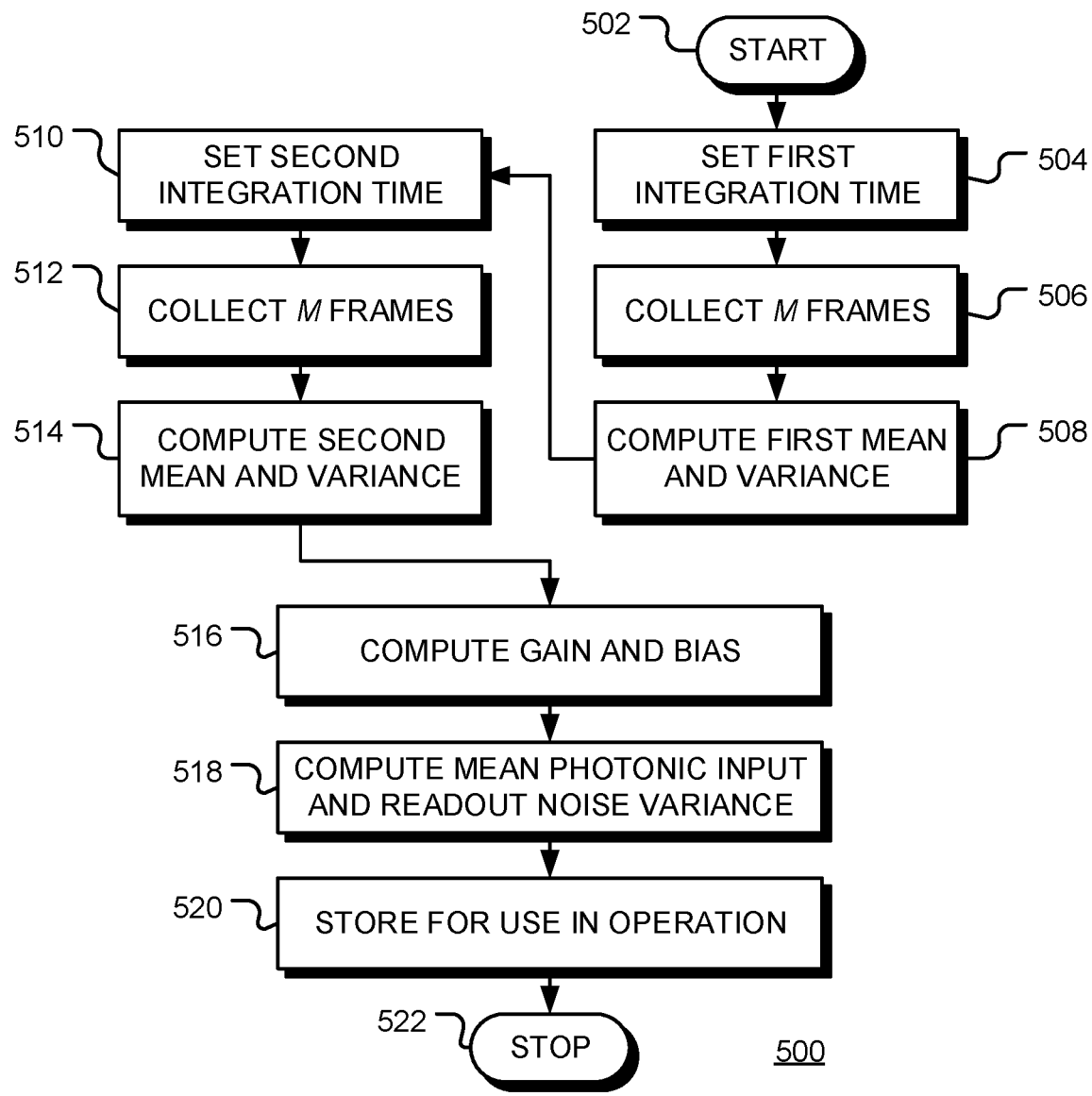
FIG. 5 is a flow chart of a method of radiometric calibration, in accordance with a representative embodiment.

FIG. 5 is a flow chart of a method 500 of radiometric calibration, in accordance with a representative embodiment. Following start block 502, a first integration or accumulation time $T_1$ for a photo-detector is set at block 504. At block 506, M frames or measurements are collected at the selected integration time. M may be selected, based on an initial estimate of the readout noise, to be larger enough that the readout noise tends to be averaged out. At block 508, the mean and variance of the measurement set are calculated to provide a first mean and a first variance. A second integration or accumulation time $T_2$ for the photo-detector is set at block 510. At block 512, M frames or measurements are collected at the selected integration time. At block 514, the mean and variance of the measurement set are calculated to provide a second mean and a second variance. Of course, the order of operation may be varied. For example, the integration time may be alternated between measurements, all of the measurements may be made before the calculation is performed, or the means and variances may be computed in a recursive manner without storing measurements.

At block 516, the gain and bias values are computed, as in equations (18) and (16) for example. Optionally, at block 518, the phonic rate and readout noise are computed using equations (17) and (19), for example. The values may be stored for use during future operation at block 520 and the process terminates at block 522.

Validation Through Simulation

The method disclosed above has been validated by directly comparing estimates of the unknown calibration parameters gain, G, and bias, B, to known simulated data. To generate each of an arbitrary number of 100×100 pixel frames of data, a gain, G, is set for each pixel based on a Gaussian distribution with mean 1 and standard deviation 0.05. Similarly, a bias, B, is set for each pixel based on a Gaussian distribution with mean 100 and standard deviation 1. The second integration time is fixed at twice the first integration time for all pixels and frames. The $\overline{K}$ parameter is used to generate the photonic input K in each pixel, in each frame by realizing a Poisson random variable with $\overline{K}$ as the mean. The additional additive noise terms in each pixel, $n_{1,2}$, are taken from a Gaussian distribution with zero mean, unity variance and an amplitude weighting of 10, independently for each frame. The test simulation was looped over a varying number of frames to assess the impact of frame count on the gain and bias estimates. The number of frames or measurements is varied in the range of 1 to 500 in increments of 10.

Figure 2:
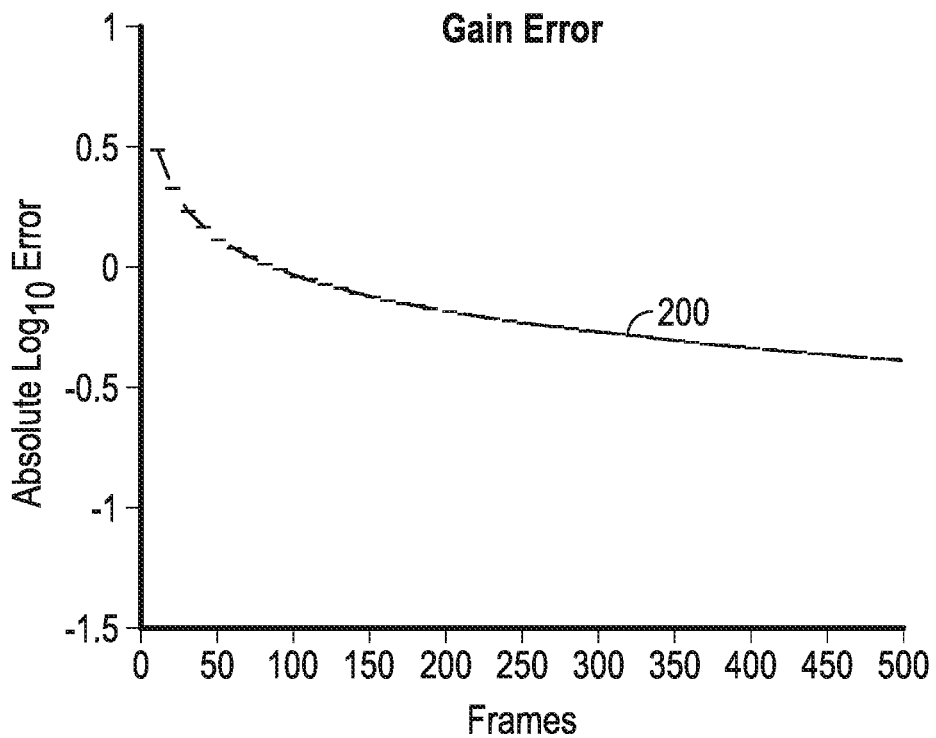
FIG. 2 shows a graph of gain calibration errors as a function of the number of frames measured, in accordance with a representative embodiment.
Figure 3:
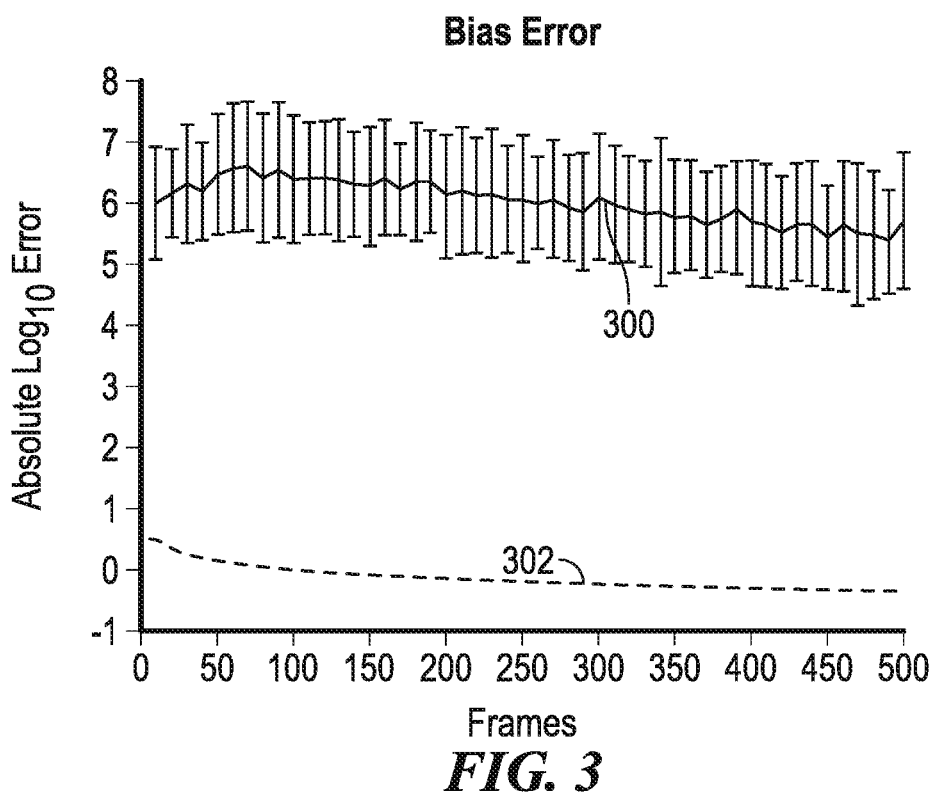
FIG. 3 shows a graph of bias calibration errors as a function of the number of frames measured, in accordance with a representative embodiment.

FIG. 2 and FIG. 3, respectively, show graphs of gain and bias errors as a function of the number of frames measured. In FIG. 2 and FIG. 3, data points are spaced every 10 frames, with error bars showing one standard deviation. The results shown in FIG. 2 clearly show that the error in G follows the same curve 200 in both S3NUC and SANUC. This is as expected because the equation to recover the gain is the same in both algorithms.

In FIG. 3, the error in the bias B is substantially different between S3NUC and SANUC procedures. The S3NUC procedure 300 has much higher error than SANUC at low frame count numbers. SANUC also demonstrates comparatively flat error standard deviation 302. The higher error in S3NUC is attributed to the cascading error in the bias estimate.

Figure 4:
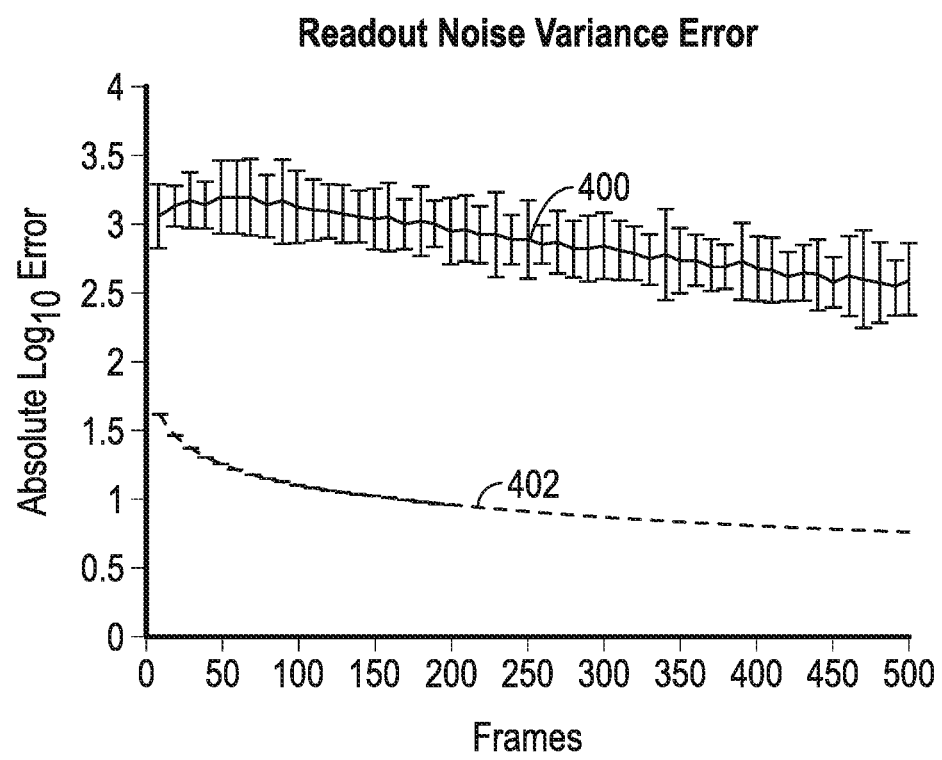
FIG. 4 shows a graph of readout noise calibration errors as a function of the number of frames measured, in accordance with a representative embodiment.

FIG. 4 shows a similar trend to FIG. 3 in the differences between S3NUC and SANUC. As with the bias, the S3NUC method 400 relies on the recovered gain to calculate the readout noise variance, while SANUC 402 still only uses the statistics of the data itself, negating a cascading error.

It is readily concluded that the SANUC method substantially out-performs the original S3NUC method for low frame counts, producing higher accuracy results with drastically lower frame count requirements. Additionally, the improved reliability of the higher order variables makes further data exploitation tractable.

Demonstration of the Radiometric Accuracy

The mean photonic input $\overline{K}$, from equation (11) for example, is intrinsically related to the number of photons received by a photo-detector. As a further validation of the calibration procedure, the radiometric accuracy of the $\overline{K}$ estimate has been assessed against the output of a known light source for the SANUC method. FIG. 1, discussed above, shows a simple imaging system that may be used to observing a light source with a known power output. This system was used to assess the radiometric accuracy of the SANUC procedure. A pinhole aperture was used.

Using well established radiometry techniques, the expected number of photons received by the sensor from a well characterized light source and optical train can be calculated analytically using, $$E[K] = \frac{r^2 P_t \Delta t}{hv(\tan(\theta_t)R)^2} \quad (21)$$

where K is the number of photons at the detector, $P_t$ is the power produced by the source, $\Delta t$ is the integration time of the sensor, and hv is Planck's constant times the frequency of the light from the source, r is the radius of the receiver aperture, R is the distance from the source to the receiver aperture and $\theta_t$ is the half the divergence angle of source. The light source used in this experiment was the Thor Labs LED555L. The relevant technical specifications of this glass lens LED are listed in Table 1. The power output is well characterized with respect to input current and bias, viewing angle, and spectrum. For this experiment, the LED was driven with a forward pulsed diode current maintained at 50 mA, to generate a consistent 1 mW optical output.

TABLE 1

Technical Specifications for the Thor Labs LED555L Laser Diode.

| Specification | Min | Typical | Max |
|---|---|---|---|
| Forward Voltage at 50 mA | — | 3.5 V | 4 V |
| Continuous operating current | — | 20 mA | 30 mA |
| Optical Output power 50 mA | — | 1 mW | — |
| Viewing Half-Angle | — | 20° | — |
| Peak Wavelength | 545 nm | 555 nm | 565 nm |
| Bandwidth FWHM | — | 40 nm | — |

Images of the source are captured by an AVT Stingray F-504B camera, through a 200 micrometer diameter pin hole and 18 cm focal length lens, illuminated from a distance of 4.33 meters. This camera features a monochrome CCD sensor with a 2452(H)×2056(V) image-output resolution and pixel dimensions on the CCD sensor measuring 3.45 μm×. The image of the pinhole illuminates an area approximately 200 pixels in diameter, which allows for a sufficient set of independent pixel measurements for statistical analysis. The base exposure time was set at 100 ms and the software driven camera gain to 20 dB.

Both the output of the radiometry equation using the source specifications and the magnitudes reported in the images are in units of average photoelectrons, and the radiometry equation accounts for all of the photons from the light source which enter the entire aperture. After the image is corrected by removing the gain and bias via the general SANUC method, the corrected image in K is simply summed to collect the entire photoelectron count. The total photoelectron count is then divided by the quantum efficiency of the detector in order to convert the number of photoelectrons into photons.

Table 2 details the results of using SANUC for a radiometry estimate on the average of 100 frames of the fully bright LED light source. The experimental results agree with the theoretical radiometry calculation with only 2.7% absolute error.

TABLE 2

SANUC estimates and radiometry results for fully bright LED.

| | |
|---|---|
| Background Gain Estimate | 661.8228 |
| Background Bias Estimate | 42.46 |
| Spot Gain Estimate | 83.5506 |
| Spot Bias Estimate | 110.56 |
| Theoretical Photons | 2.2406 × 10$^6$ |
| SANUC Estimated Photons | 2.1844 × 10$^6$ |
| Absolute Error | 2.7% |

The disclosed SANUC calibration procedure drastically reduces the error in the bias and readout noise variance estimates compared with the prior S3NUC procedure. As demonstrated in simulated data in FIGS. 3 and 4. The SANUC procedure exhibits orders of magnitude less error than the S3NUC method for calibrations taken with approximately 100 frames of data, improving its suitability for in-situ operations and radiometric calibration. The radiometric estimates of the number of photons collected from the diode by the camera in the experiment described are in good agreement, less than 2.7% absolute error, with those predicted by radiometry, as shown in Table 2. This result confirms that with as little as 100 frames of data, an accurate estimate of the number of photons from an optical source can be attained.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled, or executed to run on one of the above devices, as well as heterogeneous combinations of processors, processor architectures, or combinations of different hardware and software. In another implementation, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another implementation, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random-access memory associated with a processor), or a storage device such as a disk drive, flash memory or any other optical, electromagnetic, magnetic, infrared or other device or combination of devices. In another implementation, any of the systems and methods described above may be embodied in any suitable transmission or propagation medium carrying computer-executable code and/or any inputs or outputs from same.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y, and Z may include any method of directing or controlling any combination of such other individuals or resources to perform steps X, Y, and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It should further be appreciated that the methods above are provided by way of example. Absent an explicit indication to the contrary, the disclosed steps may be modified, supplemented, omitted, and/or re-ordered without departing from the scope of this disclosure.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the scope of this disclosure and are intended to form a part of the disclosure as defined by the following claims, which are to be interpreted in the broadest sense allowable by law.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

We claim:

1. An apparatus that determines radiometric calibration values for a radiometry system comprising:
    a readout circuit configured to retrieve a first input from a photo-detector collected over a first integration time to provide a first measurement, and to retrieve a second input from the photo-detector collected over a second integration time to provide a second measurement, where the first and second measurements are related to a photonic input to the photo-detector by a gain and a bias;
    an averaging unit configured to determine a first mean value of a plurality of first measurements and a second mean value of a plurality of second measurements;
    a variance unit configured to determine a first variance value of the plurality of first measurements and a second variance value of the plurality of second measurements, when the first variance value is dependent upon the first mean value and the second variance value is dependent upon the second mean value; and an arithmetic unit configured to determine the gain and bias from the first and second mean values and the first and second variance values.

2. The apparatus of claim 1, where the readout circuit is subject to additive noise and where the arithmetic unit is further configured to determine a variance of the additive noise.

3. The apparatus of claim 1, where the gain and bias determined by the arithmetic unit are further dependent upon one or more third mean values and one or more third variances, computed from measurements collected over one or more third integration times.

4. The apparatus of claim 1, where the second integration time is approximately twice the first integration time.

5. The apparatus of claim 1, where the second integration time is at least twice the first integration time.

6. The apparatus of claim 1, where the arithmetic unit is configured to determine the gain and bias from the first and second mean values and the first and second variance values dependent upon the first and second integration times or a ratio between the first and second integration times.

7. The apparatus of claim 1, further comprising a calibrator configured to
receive a measurement from a photo-detector; and
determine a photonic input to the photo-detector, from the received measurement,
dependent upon the determined gain and the determined bias.

8. The apparatus of claim 7, where the calibrator is further configured to determine a number of photons received by the photo-detector during an integration time.

9. The apparatus of claim 1, further comprising the photo-detector.

10. The apparatus of claim 9, where the photo-detector comprises a charge-coupled-device (CCD) array.

11. A method of radiometric calibration for determining gain and bias values of a radiometry system, the method comprising:
collecting a plurality of first measurements from a photo-detector, each integrated over a first integration time;
determining a first mean and a first variance of the first measurements;
collecting a plurality of second measurements from a photo-detector, each integrated over a second integration time;
determining a second mean and a second variance of the second measurements;
determining the gain and bias values of the photo-detector from the first and second means and the first and second variance; and
storing the determined gain and bias values for use in determining a photonic input to the photo-detector from a measurement.

12. The method of claim 11, where the bias B is determined as $$B = \frac{T_2 \overline{D}_1 - T_1 \overline{D}_2}{T_2 - T_1},$$

where $T_1$ is the first integration time, $T_2$ is the second integration time, $\overline{D}_1$ is the first mean and $\overline{D}_2$ is the second mean, and where the gain is determined as:

$$G = \frac{\sigma_{D_2}^2 - \sigma_{D_1}^2}{\overline{D}_2 - \overline{D}_1},$$

where $\sigma_{D_1}^2$ is the first variance and $\sigma_{D_2}^2$ is the second variance.

13. The method of claim 11, where collecting the plurality of first and second measurements from the photo-detector subject to readout noise, the method further comprising:
determining a variance of the readout noise from the first and second variances.

14. The method of claim 13, where the variance of the readout noise is determined as $$\sigma_n^2 = \frac{T_2 \sigma_{D_1}^2 - T_1 \sigma_{D_2}^2}{T_2 - T_1},$$

where $T_1$ is the first integration time, $T_2$ is the second integration time, $\sigma_{D_1}^2$ is the first variance, and $\sigma_{D_2}^2$ is the second variance.

15. The method of claim 11, further comprising determining a rate of photonic input to the photo-detector as $$r = \frac{(\overline{D}_2 - \overline{D}_1)^2}{(T_2 - T_1)(\sigma_{D_2}^2 - \sigma_{D_1}^2)},$$

where $T_1$ is the first integration time, $T_2$ is the second integration time, $\overline{D}_1$ is the first mean, $\overline{D}_2$ is the second mean, $\sigma_{D_1}^2$ is the first variance, and $\sigma_{D_2}^2$ is the second variance.

16. The method of claim 11, further comprising:
collecting a third measurement D from the photo-detector, the measurement integrated over a third integration time;
retrieving the stored gain value G and a stored bias value B; and
determining a photonic input K to the photo-detector according to:

$$K=(D-B)/G.$$

17. The method of claim 11, further comprising:
setting the first integration time; and
setting the second integration time.

18. A non-transitory computer readable medium storing a program of instructions that, when executed on a processor, performs the method of claim 11.

19. An apparatus that determines radiometric calibration values for a radiometry system comprising:
a readout circuit configured to retrieve a first input from a photo-detector collected over a first integration time to provide a first measurement, and to retrieve a second input from the photo-detector collected over a second integration time to provide a second measurement, where the first and second measurements are related to a photonic input to the photo-detector by a gain and a bias;
a timer, coupled to the readout circuit, and configured to set the first and second integration times;

a hardware processor configured to:
compute a first mean value of a plurality of first measurements and a second mean value of a plurality of second measurements;
compute a first variance value of the plurality of first measurements and a second variance value of the plurality of second measurements, when the first variance value is dependent upon the first mean value and the second variance value is dependent upon the second mean value; and
determine the gain and bias from the first and second mean values and the first and second variance values, and
a memory configured to store the determined gain and bias.

20. The apparatus of claim 19, further comprising a calibrator configured to
receive a measurement from a photo-detector; and
determine a photonic input to the photo-detector, from the received measurement, dependent upon the determined gain and the determined bias.

21. The apparatus of claim 20, where the calibrator is further configured to determine a number of photons received by the photo-detector during an integration time.

22. The apparatus of claim 20, further comprising the photo-detector.

23. The apparatus of claim 22, where the photo-detector comprises a charge-coupled-device (CCD) array.

* * * * *